United States Patent [19]
Norris

[11] Patent Number: 4,519,445
[45] Date of Patent: May 28, 1985

[54] TUBE-IN-SHELL HEAT EXCHANGERS

[75] Inventor: Michael A. Norris, Preston, England

[73] Assignee: United Kingdom Atomic Energy Authority, London, England

[21] Appl. No.: 555,507

[22] Filed: Nov. 28, 1983

[30] Foreign Application Priority Data

Dec. 2, 1982 [GB] United Kingdom ............... 8234382
Sep. 8, 1983 [GB] United Kingdom ............... 8324106

[51] Int. Cl.³ .......................... F28F 9/02; F16L 41/08
[52] U.S. Cl. .................................. 165/76; 165/158
[58] Field of Search ...................... 165/158, 173, 76

[56] References Cited
U.S. PATENT DOCUMENTS 3,317,222  5/1967  Maretzo ............................ 165/76 X
3,782,450  1/1974  Swozil ............................. 165/180 X

FOREIGN PATENT DOCUMENTS 2032559  5/1980  United Kingdom .

Primary Examiner—Allen M. Ostrager
Attorney, Agent, or Firm—William R. Hinds

[57] ABSTRACT

For protecting a tube to tube plate joint in a tube-in-shell heat exchanger, or for repairing a joint of the same kind which has become defective, a sleeve is employed to bridge the joint and is sealingly secured at one end to the tube plate within the bore thereof and at the other end within the tube. The joint with the tube is a brazed joint. The inside surface of the tube is machined to provide a tapered surface and the exterior surface of the sleeve is machined to provide a matching tapered surface. A land and grooves are formed in the tapered surface, the sleeve is fitted within the tube with the surfaces in engagement, and the brazed joint is made with braze material contained in grooves flowing into a capillary clearance which is of uniform and reproducible dimension from joint to joint.

6 Claims, 1 Drawing Figure

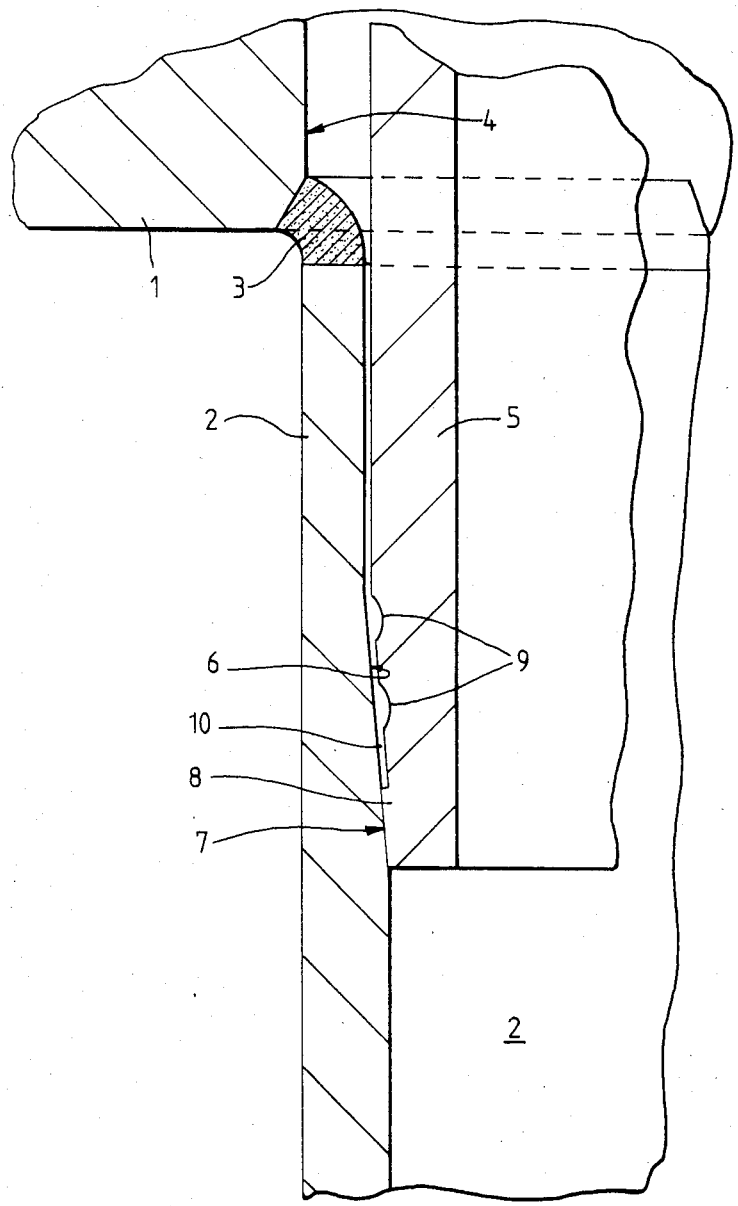

TUBE-IN-SHELL HEAT EXCHANGERS

This invention relates to tube-in-shell heat exchangers.

A heat exchanger of the tube-in-shell type comprises a shell having at least one tube sheet or plate into which open-ended tubes are secured by joints for example welds. In use, a first fluid is passed through the tubes and a second fluid is passed through the shell and heat transfer between the fluids is effected. One example of the application of such a heat exchanger is in connection with a power-producing fast nuclear reactor, wherein liquid sodium metal which has been heated (indirectly in the case of most practical designs) by the heat generated in the reactor core is caused to flow through the shell of the heat exchanger and water is caused to flow through the tubes in order to evaporate the water by the heat transferred from the liquid sodium in the shell and raise steam, subsequently superheated, for power production using a turbine. In such a heat exchanger, serving in this example as an evaporator, it is usual to protect the joints of the tubes to the upper tube plate by confining an inert blanket gas above the sodium level in the shell so as to avoid direct contact between the sodium and the joints. In spite of this, experience has shown that where the joints are welds, these can develop cracks through which high pressure water can leak and react with sodium vapour in the blanket gas, producing impurities which can build up and contaminate the sodium to an unacceptable degree. Where an unprotected weld develops a leak, it is common practice to make the relevant steam tube redundant by plugging it, but where a number of tubes have had to be made redundant, the heat exchanger loses efficiency. It would obviously be advantageous therefore to be able to effect repair where a defective joint or joints develop, instead of having to resort to plugging.

Commonly assigned British Patent Specification No. 2,032,559A discloses a method of effecting repair where one or more defective tube to tube plate joints develop in a tube-in-shell heat exchanger, such method consisting of inserting a tubular sleeve within a tube with a defective joint and sealingly bonding the end regions of the sleeve to the tube and to the tube plate to bridge the defective joint. Examples of ways of achieving such bonding disclosed in the said specification are explosive welding and brazing. In a specific construction described therein the upper end of the sleeve is sealingly bonded to the upper tube plate by explosive welding and the lower end of the sleeve is sealingly bonded to the relevant tube by high temperature brazing. For the latter, the lower end of the sleeve is formed with, for example, two lands with sufficient clearance to allow the lands to slide freely into the tube. Intermediate the lands are, for example, two grooves for containing braze material. The inside wall of the tube must be cleaned prior to insertion of the sleeve in the tube and after insertion, the lower end of the sleeve is expanded radially by roll swaging to bring the lands into a position in which there is a capillary clearance between the sleeve lands and the tube to accommodate melted braze material. This clearance is critical and is not easy to reproduce infallibly by roll swaging each time a repair is effected.

It is an object of the present invention to provide for the achieving of conditions which will allow successful brazed joints to be readily performed, either in the context of the protection of tube to tube plate joints or of the repair of heat exchangers with defective tube to tube plate joints.

Another approach to the problem of joints between tubes and tube plate becoming defective is to protect these joints from the outset by designing the heat exchanger so as to incorporate such protection. Thus, it would be advantageous to adopt the provision of sleeves as aforesaid in the design of the heat exchanger, instead of having to incorporate them after defects occur with the consequent penalty of down-time and the necessity for draining and cleaning before repairs can begin, even at the expense of added material and the necessity for the production of joints additional to the normal tube to tube plate joints.

According to the invention, a heat exchanger of the tube-in-shell type with joints between the tubes and each tube plate, has a tubular sleeve within each tube and bridging the joint between each tube and at least one tube plate and with the end regions of each sleeve sealingly secured to the tube at one end and to the tube plate at the other end of the sleeve respectively, each tube being tapered on its inner surface, each sleeve having a matching taper on its outer surface and at or near that end thereof which registers with the respective tube, each sleeve having at least one land formed on, and at least one groove formed in, its tapered surface, each sleeve being fitted to the respective tube with the tapered surfaces in engagement, and a brazed joint being made therebetween with the aid of braze material accommodated within the clearance between the surfaces provided by the groove or grooves, whereby the joints between the tubes and tube plate are individually protected.

According to another aspect of the invention, a method of repairing a defective joint between a tube and a tube plate of a tube-in-shell heat exchanger, includes the preparation of a brazed joint between the tube with a defective joint and one end of a sleeve within the tube and employed to bridge the defective joint, said preparation involving the steps of effecting a taper on the inner surface of the tube, such taper matching a taper provided on the outer surface of the sleeve at or near its said end, the tapered surface of the sleeve having at least one land thereon and at least one groove therein, fitting the sleeve within the tube with the tapered surfaces in engagement, and effecting a brazed joint between the tube and the sleeve at or near its said end with the aid of braze material accommodated in the groove or grooves.

The provision of the tapered surfaces enables the assembly of sleeves with tubes wherein there can be a fairly wide tolerance between matching diameters of sleeves and tubes. The only variant will be the amount by which the tube plate end of the sleeve will be distanced from the outer surface of the tube plate. However, the technique of explosive welding is sufficiently flexible to accept such variations provided they are not excessive.

The execution of a typical repair will now be described by way of example with reference to the accompanying drawings, wherein the sole FIGURE is a fragmentary side view in section.

A tube sheet or plate 1 has its tubes, part of one of which is shown, designated 2, secured to it by a weld 3, so that it registers with a bore 4 in the tube plate 1. If the weld 3 becomes defective, a sleeve 5, the lower end only of which is shown (the upper end being secured to the tube plate 1 at the upper end of bore 4 by means such as an explosive weld, not shown), is placed in position to bridge the defective weld and enable the tube 2 to continue being used, thus avoiding the need for plugging the tube 2. The tube 2 is machined to provide a tapered surface 6, material being removed from the inside of the tube 2 by a suitable machining technique. The exterior surface of the sleeve 5 is also machined to provide a matching tapered surface 7, the degree of matching being carefully controlled so as to be high. The machining of sleeve 5 is effected so as to leave an upstanding land 8 at the lower end of the sleeve 5, and grooves 9 for braze material in the tapered surface 7. The height of the land 8 determines a parallel-sided capillary clearance 10 between the tapered surface 6 and tapered portions below the land 8, and which will be filled with melted braze material when brazing is performed and effect the sealing joint required. Because the land 8 height can be finely controlled by ordinary machining methods, the capillary clearance 10 can be made uniform and predictable from jont to joint, when the tapered surfaces 6, 7 are made to engage, a feature not possessed by the technique referred to earlier which involved roll swaging after assembly.

A further advantage lies in the fact that, with the preparation according to the invention, the weakest part of the tube after machining will be disposed at a level protected by the sleeve after the joint has been made, whereas, with the prior technique involving roll swaging, the weakest part of the tube lies at a level below the lower end of the sleeve after joining, being thus unprotected. Furthermore, machining with the prior technique leaves a notch which as well as being unprotected can act as a stress concentrator during subsequent operation. However, the taper machining process does not leave a machined notch to act as a subsequent stress concentration as does the prior technique.

It will be readily appreciated that the repairing technique described with reference to the drawing can easily be modified to enable a heat exchanger to be produced in which the normal tube to tube plate joints are each protected by a sleeve within the respective tube and bridging the joint and sealingly secured to the tube at one end and to the tube plate at the other end, thus giving double protection against leakage. In a production process for the heat exchangers, the tubes and sleeves would be produced with the matching tapers and with the sleeve lands, grooves, and capillary clearances, by controlled production forming processes giving a high degree of accuracy and reproduceability. Furthermore the brazed joints would be produced under carefully controlled factory conditions and both sleeve joints could be tested for integrity by known factory techniques.

The taper angle selected depends inter alia on the wall thickness of the tubes, since an excessive taper angle could lead to undue weakening of the tubes. A conical included angle of about 92° (ie ~ 1° from the line of the tube wall) should be satisfactory for many applications, although other taper angles might be used. The length of the tapered surfaces is likely to be selected to ensure leak tightness of the brazed joint.

The height of the land 8 should be between 0.013 mm and 0.051 mm to provide an optimum capillary clearance 10 for braze material.

I claim:

1. A heat exchanger of the tube-in-shell type with joints between the tubes and each tube plate, having a tubular sleeve within each tube and bridging the joint between each tube and at least one tube plate and sealingly secured to the tube at one end and to the tube plate at its other end respectively, wherein the improvement comprises, each tube being tapered on its inner surface, each sleeve having a matching taper on its outer surface at or near said one end thereof, each sleeve having at least one land formed on, and at least one groove formed in, its tapered surface, each sleeve being fitted to the respective tube with the tapered surfaces in engagement, and a brazed joint being made therebetween with the aid of braze material accommodated within the clearance provided between the surfaces defined by the groove or grooves and the tapered inner surface of the tube, whereby the joints between the tubes and the tube plate are individually protected.

2. A heat exchanger as claimed in claim 1 wherein the tapered inner surface of each tube is about 92° included conical angle.

3. A heat exchanger as claimed in claim 1, wherein the height of the land is between 0.013 mm and 0.051 mm.

4. A method of repairing a defective tube joint between a tube and a tube plate of a tube-in-shell heat exchanger including the preparation of a brazed joint between the tube and a sleeve within the tube, wherein the improvement comprises said preparation involving the steps of effecting a taper on the inner surface of the tube, such taper matching a taper provided on the outer surface of the sleeve at, or near, one end thereof, the tapered surface of the sleeve having at least one land thereon and at least one groove therein, fitting the sleeve inside the tube with the tapered surfaces in engagement, and effecting a brazed joint at the clearance between the tapered inner surface of the tube and the groove in the sleeve with the aid of braze material accommodated in the groove.

5. A method as claimed in claim 4, wherein the taper effected is about 92° included conical angle.

6. A method as claimed in claim 4, wherein the height of the land is between 0.013 mm and 0.051 mm.

* * * * *